(12) United States Patent
Sugaya

(10) Patent No.: US 7,882,205 B2
(45) Date of Patent: Feb. 1, 2011

(54) DEVICE SETTING APPARATUS, DEVICE SETTING METHOD, INFORMATION ACQUIRING APPARATUS, INFORMATION ACQUIRING METHOD, STORAGE MEDIUM, AND PROGRAM

(76) Inventor: Shunji Sugaya, 904 Grandgara Mita, 5-4-1, Shiba, Minato-ku, Tokyo (JP) 108-0014

( * ) Notice: Subject to any disclaimer, the term of this patent is extended or adjusted under 35 U.S.C. 154(b) by 573 days.

(21) Appl. No.: 11/852,126

(22) Filed: Sep. 7, 2007

(65) Prior Publication Data

US 2009/0066984 A1    Mar. 12, 2009

(51) Int. Cl.
G06F 15/177    (2006.01)
G06F 12/00    (2006.01)
(52) U.S. Cl. .................................. 709/220; 709/221
(58) Field of Classification Search ......... 709/220–221, 709/217–219, 224–228, 250
See application file for complete search history.

(56) References Cited

U.S. PATENT DOCUMENTS

| | | | | |
|---|---|---|---|---|
| 7,206,823 | B2 * | 4/2007 | Furukawa et al. | 709/218 |
| 2002/0174271 | A1 * | 11/2002 | Tanigawa et al. | 710/11 |
| 2004/0267904 | A1 * | 12/2004 | Kisono | 709/217 |
| 2005/0114625 | A1 * | 5/2005 | Snyder | 712/1 |
| 2005/0160136 | A1 * | 7/2005 | Takahashi | 709/200 |
| 2006/0002352 | A1 * | 1/2006 | Nakamura | 370/338 |
| 2007/0055411 | A1 * | 3/2007 | Nihei et al. | 701/1 |

FOREIGN PATENT DOCUMENTS

| | | |
|---|---|---|
| JP | H11-316725 A | 11/1999 |
| JP | 2006-119820 A | 5/2006 |

* cited by examiner

*Primary Examiner*—Zarni Maung
(74) *Attorney, Agent, or Firm*—Carter, DeLuca, Farrell & Schmidt, LLP

(57) ABSTRACT

The present invention provides an easy and automatic setting process for an external device regardless of the type of external device connected. Device information is acquired by a device information acquiring unit 31 from an external device 20 that is communicably connected; setting information of the external device is analyzed based on the acquired device information by a device information analyzing unit 32; a setting technique corresponding to the external device is determined based on analysis results and performs the setting process for the external device by a setting performing unit 35 to automatically recognize the external device, thereby allowing a setting process to be automatically executed according to the recognized device.

12 Claims, 15 Drawing Sheets

FIG. 10A

[SETTING OF CONNECTION TARGET]

| NAME OF CONNECTION TARGET | |
|---|---|
| USER NAME OF CONNECTION TARGET | |
| CONNECTION PASSWORD | |
| | |

FIG. 10B

```
[SETTING OF CONNECTION TARGET]
------------------------------
<TD--><--->NAME OF CONNECTION TARGET<--></TD>     ⎫
<TD><INPUT TYPE=text----------------></TD>        ⎬ 101
------------------------------                    ⎭

<TD--><--->USER NAME OF CONNECTION TARGET<--></TD> ⎫
<TD><INPUT TYPE=text----------------></TD>         ⎬ 102
------------------------------                     ⎭

<TD--><--->CONNECTION PASSWORD<--></TD>            ⎫
<TD><INPUT TYPE=password------------></TD>         ⎬ 103
------------------------------                     ⎭
```

FIG. 11

USER NAME OF CONNECTION TARGET

USER NAME FOR CONNECTION

USER NAME

USER NAME FOR CONNECTION

NAME OF CONNECTION TARGET

PPPoE USER NAME

TRANSMISSION USER ID

PPPoE CONNECTION ID

CONNECTION USER ID

ID OF CONNECTION TARGET

CONNECTION ID

DEVICE SETTING APPARATUS, DEVICE SETTING METHOD, INFORMATION ACQUIRING APPARATUS, INFORMATION ACQUIRING METHOD, STORAGE MEDIUM, AND PROGRAM

This application is based on Japanese Patent Application No. 2005-329085, filed on 14 Nov. 2005, and Japanese Patent Application No. 2006-308390, filed on 14 Nov. 2006, the content of which is incorporated herein by reference.

BACKGROUND OF THE INVENTION

1. Field of the Invention

The present invention relates to a device setting apparatus, a device setting method, an information acquiring apparatus, an information acquiring method, a storage medium, and a program, and, more specifically, to a processing technique for automatically setting a device that is connected via a communication interface and for automatically acquiring information from the device.

2. Related Art

External devices, such as a router, for example, require a setting operation for setting predetermined information to be performed in advance in order to realize a desired operation. In general, the external devices that require such a setting operation use different setting procedures, different setting screens, and different setting methods, even if the functionalities and operations of the devices to be realized are the same. For example, setting methods for external devices manufactured by the same manufacturer can be different if versions of these devices are different. Therefore, a user seeking to perform the setting of an external device has to set various information according to a setting method specific to the external device, which can be cumbersome.

SUMMARY OF THE INVENTION

A first object of the present invention is to provide an easy and automatic setting process for an external device regardless of the type of the external device that is connected. Further, a second object of the present invention is to provide easy and automatic acquisition of a state of the external device that is connected.

A device setting apparatus according to the present invention includes a device information acquiring unit that acquires device information from a device that is communicably connected; an information analyzing unit that analyzes setting information of the device based on the device information that has been acquired by the device information acquiring unit; and a setting execution unit that executes a setting process for the device by determining a setting technique corresponding to the device based on a analysis result of the information analyzing unit.

A device setting method according to the present invention includes a device information acquiring step for acquiring device information from a device that is communicably connected; an information analyzing step for analyzing setting information of the device based on the device information that has been acquired in the device information acquiring step; and a setting execution step for executing a setting process for the device using one of the setting information and a setting pattern corresponding to the device and selected based on the analysis result of the information analyzing step.

A device setting method according to the present invention includes a device information acquiring step for acquiring device information from a device that is communicably connected; an information analyzing step for performing a character search of the device information acquired in the device information acquiring step, and for analyzing a configuration of the setting information of the device, and a setting execution step for specifying the setting technique of the device based on the analysis result of the information analyzing step, and for executing a setting process for the device.

An information acquiring apparatus according to the present invention includes a device information acquiring unit that acquires device information from a device that is communicably connected; and a state information acquiring unit that performs a character search of the device information acquired by the device information acquiring unit, and analyzes and acquires state information including at least one of a setting state and an operating state of the device.

An information acquiring method according to the present invention includes a device information acquiring step for acquiring device information from a device that is communicably connected; and a state information acquiring step for performing a character search of the device information acquired in the device information acquiring step, and for analyzing and acquiring state information including at least one of a setting state and an operating state of the device.

A program according to the present invention has a computer execute the steps including a device information acquiring step for acquiring device information from a device that is communicably connected; an information analyzing step for analyzing setting information of the device based on the device information that has been acquired in the device information acquiring step; and a setting execution step for executing a setting process for the device using one of the setting information and a setting pattern corresponding to the device and selected based on the analysis result of the information analyzing step.

A program according to the present invention has a computer execute the steps including a device information acquiring step for acquiring device information from a device that is communicably connected; an information analyzing step for performing a character search of the device information acquired in the device information acquiring step, and for analyzing a configuration of the setting information of the device; and a setting execution step for specifying the setting technique of the device based on the analysis result of the information analyzing step, and for executing a setting process for the device.

A program according to the present invention has a computer execute the steps including a device information acquiring step for acquiring device information from a device that is communicably connected; and a state information acquiring step for performing a character search of the device information acquired in the device information acquiring step, and for analyzing and acquiring state information including at least one of a setting state and an operating state of the device.

A computer readable storage medium according to the present invention is such that a computer program according to Claim 21 is recorded thereon.

According to the present invention, the device information is acquired from the communicably connected device to analyze the setting information of the device, the setting technique corresponding to the device is determined based on the analysis result, and then the setting process for the device is performed. With this, it is possible to automatically recognize the communicably connected device and perform the setting technique corresponding to the recognized device, thereby allowing a user without knowledge of the model and other details of the device that is connected to readily perform the setting process.

Moreover, according to the present invention, the device information is acquired from the communicably connected device to perform the character search of the device information, and the state information including at least one of the setting state and the operating state of the device is analyzed and acquired. With this, the state information can be automatically acquired from the communicably connected device.

BRIEF DESCRIPTION OF THE DRAWINGS

FIGS. 10A and 10B respectively show diagrams for illustrating device information according to the second embodiment;

FIG. 11 shows a diagram illustrating an example of a list of character strings;

DETAILED DESCRIPTION OF THE INVENTION

The following describes embodiments according to the present invention with reference to the drawings.

First Embodiment

Figure 1:
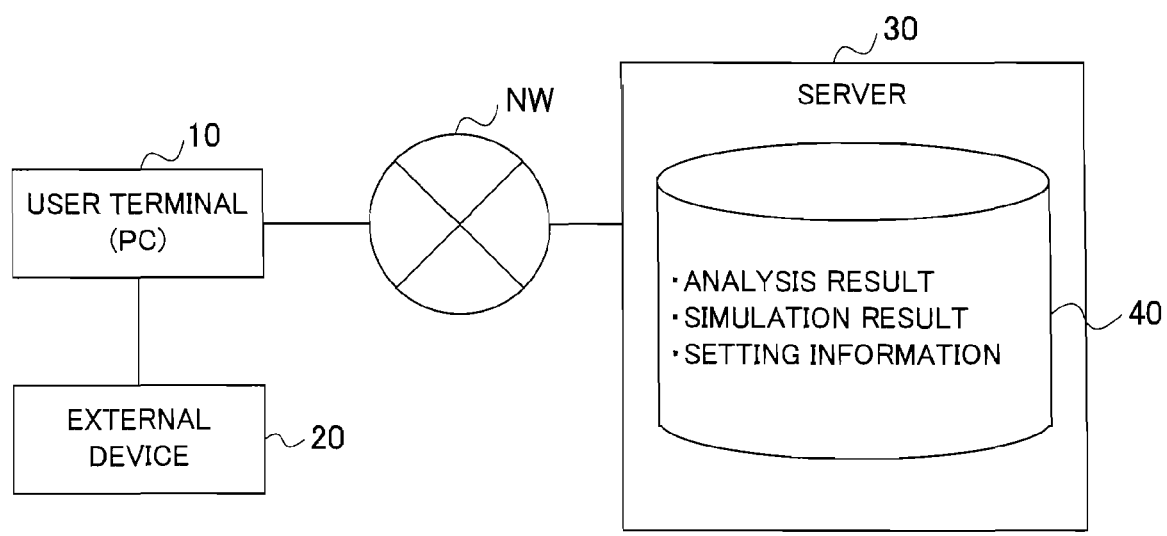
FIG. 1 shows an example configuration of an information processing system according to a first embodiment of the present invention.

FIG. 1 shows an example configuration of an information processing system according to a first embodiment of the present invention.

In FIG. 1, numeral 10 represents a user terminal (for example, a personal computer (PC)), numeral 20 represents an external device, and numeral 30 represents a server.

The user terminal 10 and the external device 20 are communicably connected through predetermined communication interfaces that are respectively provided. Further, the user terminal 10 and the server 30 are communicably connected through a network NW such as the Internet by network interfaces that are respectively provided. In a case in which the external device 20 is a device, such as a router, that can be connected to the network NW, the external device 20 can be connected to the network NW via the network interface provided for the external device 20, and then the user terminal 10 can be communicably connected to the network NW via the external device 20.

The user terminal 10 performs setting for the external device 20 that is communicably connected via the communication interface. Further, the user terminal 10 uploads information relating to the setting acquired in the setting process for the external device 20 to the server 30 via the network NW.

The external device 20 is an arbitrary device that requires setting of information in order to operate, and can execute a desired operation once the setting of the information is completed. Examples of the external device 20 include a router, an IP (Internet Protocol) telephone terminal, a set-top box, a printer, and a home server. It should be noted that these are only examples, and the external device 20 is not limited to these examples.

The server 30 includes an external storage device 40 such as a hard disk, and records and stores various information relating to the setting provided from the user terminal 10 via the network NW in the external storage device 40. The information stored in the external storage device 40 includes, for example, an analysis result of setting information and a structure, a result of a setting simulation, and setting information (setting pattern information and setting template information), and the like. Further, the server 30 provides the information stored in the external storage device 40 via the network NW, in response to such as a request from the user terminal 10.

Figure 2:
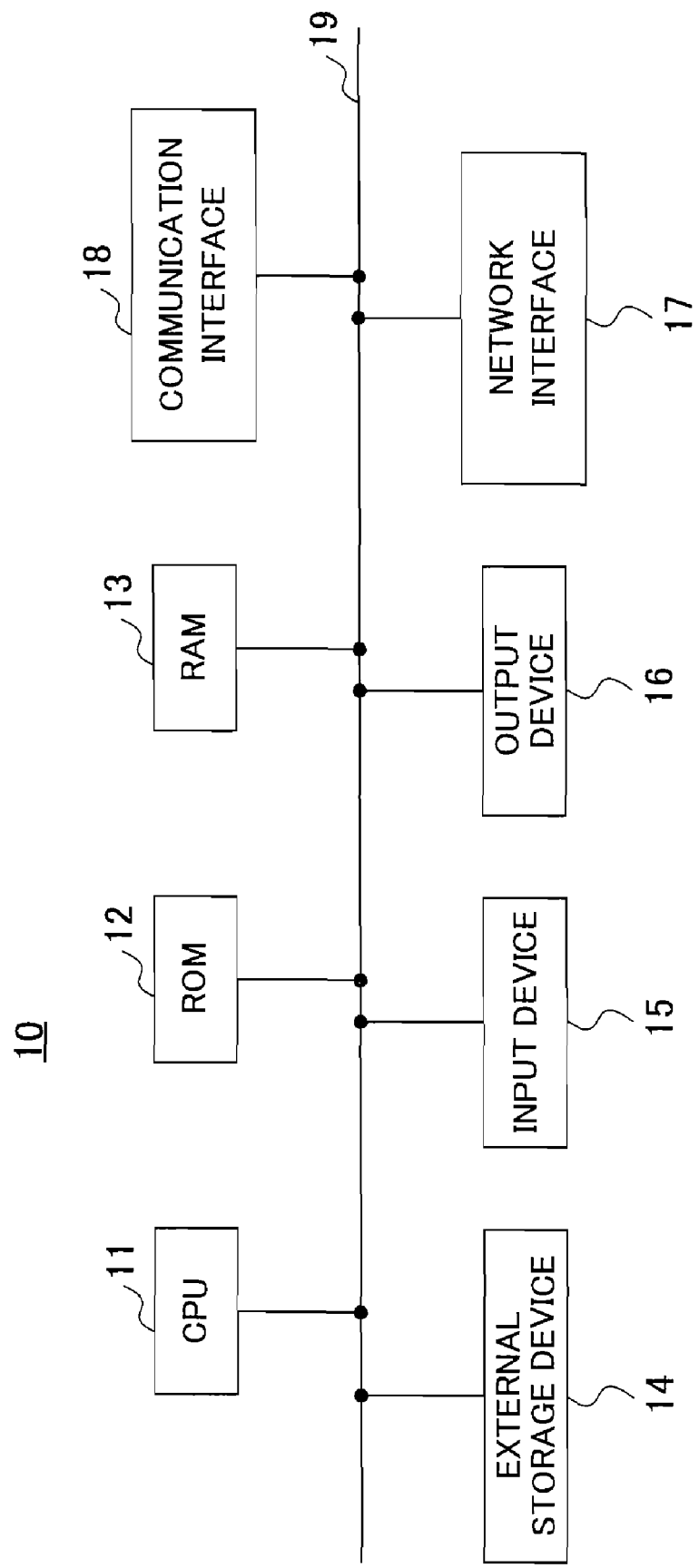
FIG. 2 shows a block diagram of an example of a hardware configuration of a user terminal.

FIG. 2 shows a block diagram of an example of a hardware configuration of the user terminal 10 shown in FIG. 1.

As shown in FIG. 2, the user terminal 10 includes a CPU 11, a ROM (read only memory) 12, a RAM 13, an external storage device 14 such as a hard disk, an input device 15, an output device 16, a network interface 17, and a communication interface 18, and these components are communicably connected with each other via a bus 19. Through the bus 19, a transfer of address signals, control signals, and various data among various components (device) that are connected to the bus 19 is performed.

The CPU 11 controls various components in the user terminal 10 connected via the bus 19, in order to perform inputting and outputting of data, sending and receiving of data, and comparing and checking of data. Such a control is performed by previously storing control procedures (computer program and software) of the CPU 11 and executing the control procedures. With this, it is possible to perform inputting and outputting of data, sending and receiving of data, and comparing and checking of data. Alternately, the control procedures may be previously stored in the external storage device 14 such as a hard disk, and the stored control procedures may be executed.

The RAM 13 is used as a working memory for inputting and outputting of data, sending and receiving of data, and comparing and checking of data, as well as a temporary storage for controlling the various components. Further, in a case in which the control procedures (computer program) for the CPU 11 is stored in the ROM 12, the program may be loaded from the ROM 12 on to the RAM 13, and the CPU 11 may execute the program loaded onto the RAM 13.

In the present embodiment, using the computer program stored in the CPU 11 and the ROM 12 (or, the external storage device 14), functions such as device information acquiring means, information analyzing means, setting execution means, estimate means, and simulating means according to the present invention are realized.

The external storage device 14 is an external storage device such as a hard disk, for example. The input device 15 is an input device such as a keyboard or a mouse, for example, and used by a user to indicate an initiation of automatic setting of a device connected to the user terminal 10. The output device 16 is an output device such as a display, for example, which is used to notify the user of a progress report of a process relating to the automatic setting of the device and of a message indicating completion of the setting.

The network interface 17 is used to connect the user terminal 10 and the network NW, and to send and receive data with another device that is connected to the network NW. The communication interface 18 is an interface for connecting the user terminal 10 and the external device 20, and for sending and receiving data relating to the setting with the external device 20. In a case in which it is possible to connect to the external device 20 via the network interface 17, the communication interface 18 is not necessarily provided.

Figure 3:
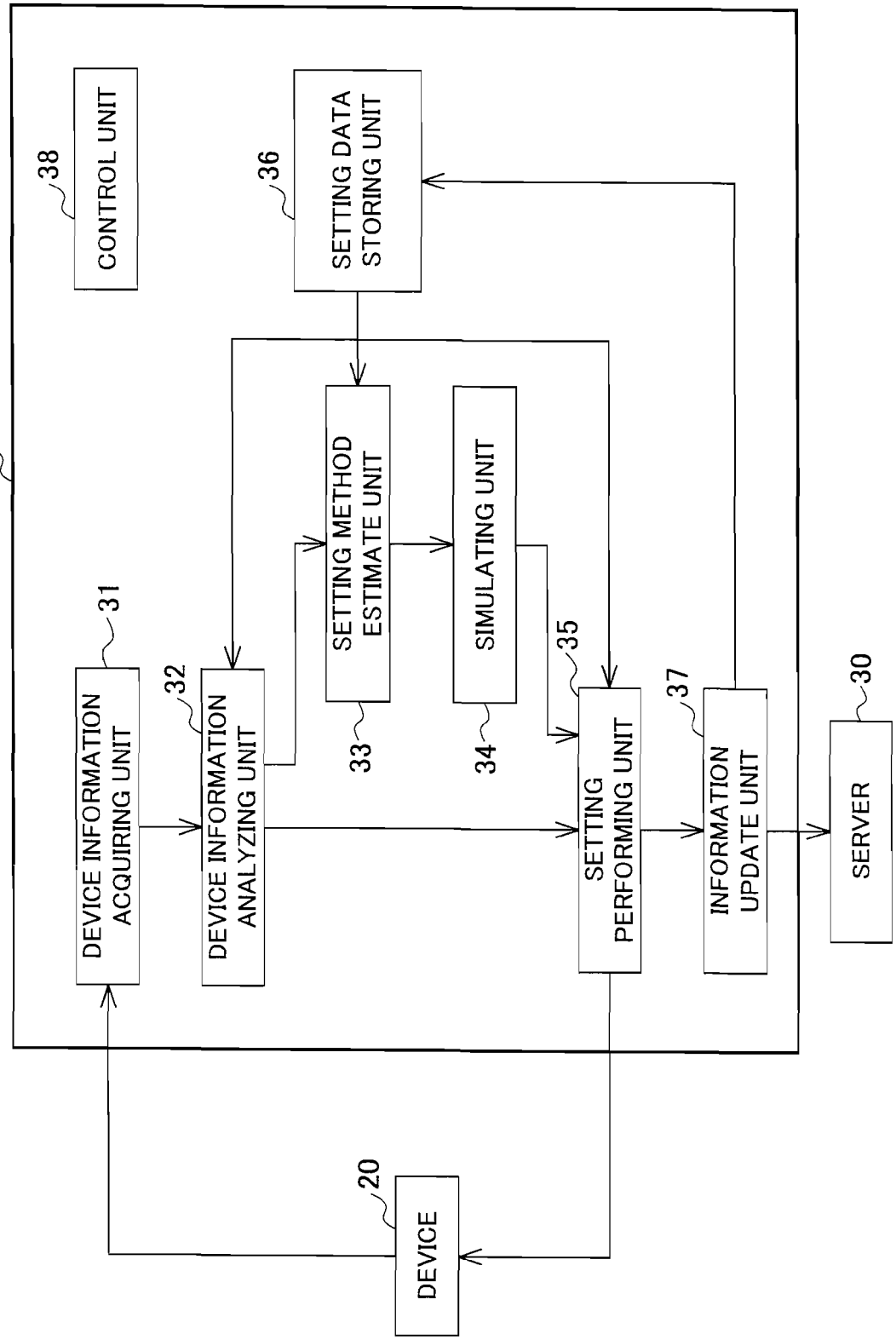
FIG. 3 shows a block diagram of an example of a functional configuration of the user terminal according to the first embodiment.

FIG. 3 shows a block diagram illustrating an example of a functional configuration of the user terminal 10 according to the first embodiment. In FIG. 3, only a functional block relating to an automatic setting process for a device in the user terminal 10 that is later described is shown, and any functional block relating to other processes (for example, a routine computing process) is omitted as being the same as in a conventional configuration. Each of functional units in the user terminal 10 shown in FIG. 3 is overall controlled by a control unit 38.

A device information acquiring unit 31 acquires device information necessary for setting, from the external device 20 to be set and communicably connected to the user terminal 10. Further, the device information acquiring unit 31 provides a device information analyzing unit 32 with the acquired device information for the external device 20.

The device information analyzing unit 32 performs a structure analysis of information used for setting (setting information) based on the device information acquired from the external device 20. Further, the device information analyzing unit 32 determines, based on the setting information and a result of the structure analysis, whether or not setting information corresponding to the external device 20 is stored in a setting data storing unit 36. In other words, the device information analyzing unit 32 determines whether or not the setting information for the external device 20 already exists in the setting data storing unit 36.

A setting method estimate unit 33 estimates a setting technique (such as setting procedures of the information) for the external device 20, based on the result of the structure analysis of the setting information by the device information analyzing unit 32. The setting method estimate unit 33 estimates, based on the setting information and the result of the structure analysis, a setting pattern that similar to the setting information for the external device 20 from setting pattern information stored in the setting data storing unit 36, and selects a setting template that corresponds to the estimated setting pattern.

The simulating unit 34 performs a simulation of the setting process for the external device 20 using the setting template selected by the setting method estimate unit 33. Further, the simulating unit 34 provides the setting method estimate unit 33 and a setting performing unit 35 with a simulation result.

The setting performing unit 35 performs an actual setting process for the external device 20 based on the result of analysis of the setting information and the structure and the estimation result of the setting patterns. Specifically, when it is determined that the setting information of the external device 20 is stored in the setting data storing unit 36 as a result of the analysis, the setting performing unit 35 performs the setting process for the external device 20 using the setting information. On the other hand, when the setting information of the external device 20 does not exist in the setting data storing unit 36, the setting performing unit 35 performs the setting process for the external device 20 based on the setting template acquired as the estimation result of the setting pattern.

An information update unit 37 performs an update process of information relating to the setting based on a result of the setting process for the external device 20. The information update unit 37 performs, for example, re-grouping the setting information, addition of a setting template, and correction of the setting template, based on a result of the simulation of the setting process. The information update unit 37 provides the setting data storing unit 36, as well as the server 30, with the above update information to update date. In addition, the information update unit 37 further provides the server 30 with the result of analysis of the setting information and the structure and the simulation result of the setting process.

The setting data storing unit 36 stores setting information for a known external device, and setting templates corresponding to the setting pattern information and the setting pattern information based on the known setting information. In a case in which the user terminal 10 has been connected to the server 30 via the network NW once, the setting pattern information and the setting template stored in the setting data storing unit 36 is replaced with the setting pattern information and the setting template stored in the external storage device 40 of the server 30 and therefore is in a up-to-date state.

In the above explanation, when the setting information of the external device 20 does not exist in the setting data storing unit 36, the user terminal 10 has the setting method estimate unit 33 estimate the setting technique, based on the result of analysis of the setting information and the structure, to realize the setting for the external device 20. However, the present invention is not limited to such an example, and the user terminal 10 may specify an operation method for setting software for setting the external device 20 based on the result of the analysis of the setting information and the structure, and may emulate an input to realize the setting of the external device 20 in a simulated manner, when the setting information of the external device 20 does not exist in the setting data storing unit 36.

Figure 4:
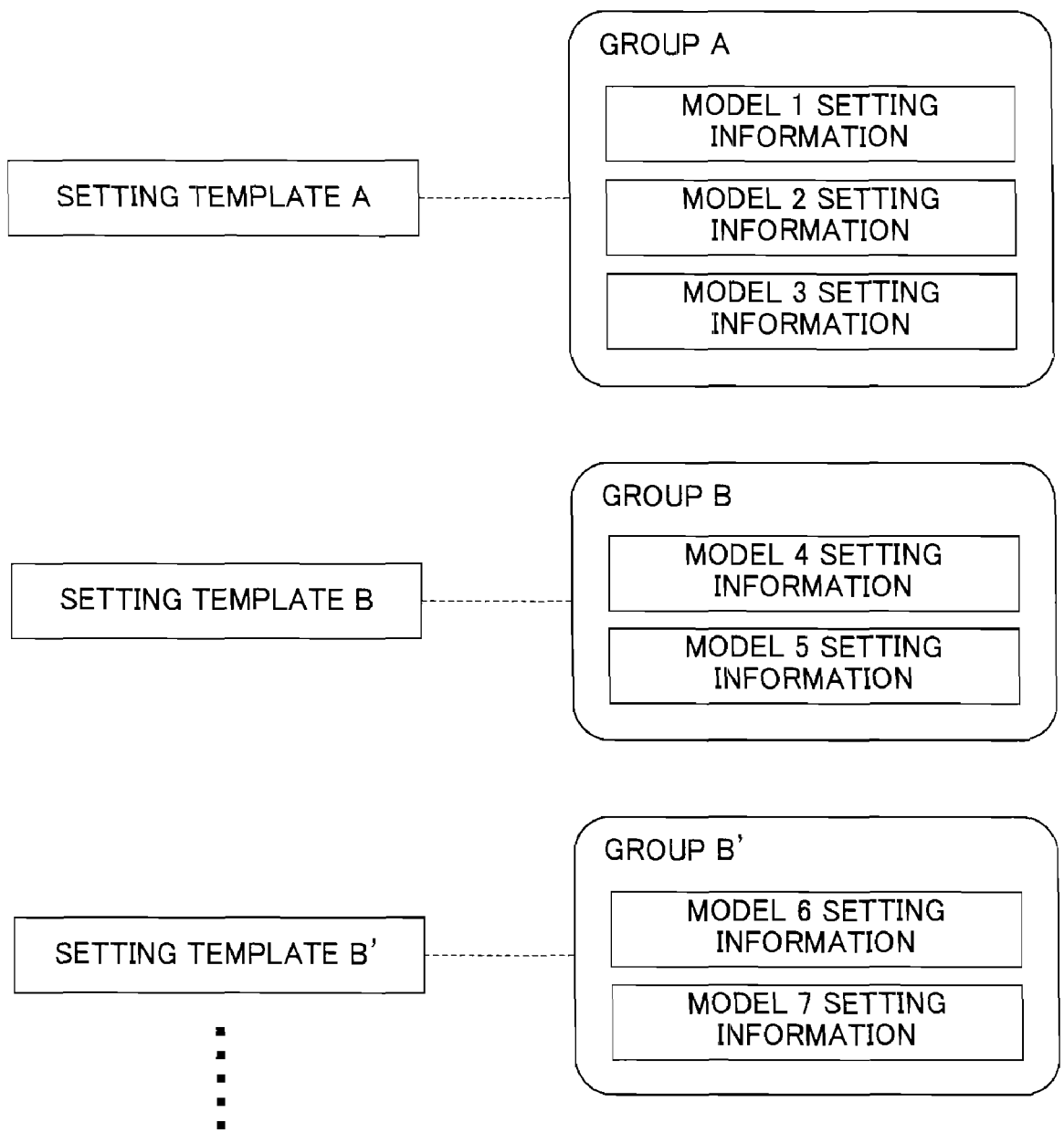
FIG. 4 shows a diagram for illustrating setting information and a setting template of a device of the first embodiment.

FIG. 4 is a diagram for illustrating the setting information and the setting template of the device stored in the setting data storing unit 36 shown in FIG. 3.

As shown in FIG. 4, the setting information for a model 1, a model 2, and a model 3, . . . is stored in the setting data storing unit 36. Further, for example, the setting information for model 1, the setting information for model 2, and the setting information for model 3 that match or are similar in the setting pattern are categorized into a group A, and a setting template corresponding to its setting technique is produced, and the produced setting template is stored in the setting data storing unit 36 as a setting template A corresponding to the setting technique for the group A.

Further, in the same manner, for example, the setting information for model 4 and the setting information for model 5 that match or are similar in the setting pattern are categorized into a group B, and a setting template corresponding to its setting technique is produced as a setting template B and stored in the setting data storing unit 36. In addition, the setting information for model 6 and the setting information for model 7 whose setting patterns are similar with the setting pattern of the group B and that match or are similar in the setting pattern are categorized into a group B', and the produced setting template is stored in the setting data storing unit 36 as a setting template B'. The setting information for model 6 and model 7 that are categorized into the group B' are, for example, the setting information that are substantially the same as the setting information for model 4 and model 5, but include a slight difference in such a case in which an amount of the setting information increases due to so-called version-up.

The setting templates A, B, and B' respectively corresponding to the setting techniques for the corresponding groups specifies setting procedures of information, an access technique, and a setting object.

In the conventional setting process for a device, various settings are performed using setting utility screens provided by corresponding devices. Accordingly, each device has a different setting screen even if information items to be inputted are the same, and setting of the information and such is required to be performed using a setting technique corresponding to a device to be set when attempting a similar setting for a same type of device that realizes a similar function is performed, which is very cumbersome.

Therefore, in the present embodiment, setting techniques for various devices are made common by using a common interface, thereby allowing the user to perform the setting process for each device without realizing a difference in setting techniques. By utilizing this, a simulation of the setting process by the simulating unit 34 of the external device 20 and an actual setting process by the setting performing unit 35 are performed.

Figure 5:
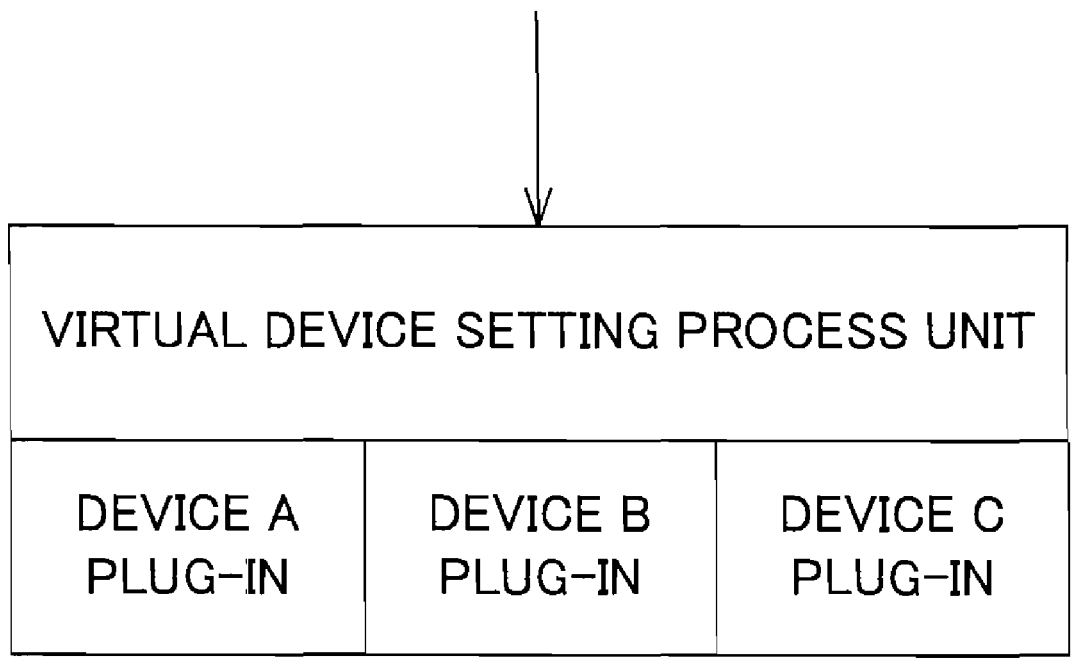
FIG. 5 shows a diagram for illustrating a setting process function in a common interface according to the present embodiment.

Specifically, as shown in FIG. 5, when input information 1 and input information 2 are set to the external device, an input interface for a virtual device setting process unit is made common, and a setting plug-in for one of devices A, B, and C is loaded internally according to a device that is connected, thereby performing the setting process for the device. Setting plug-in for the devices A, B, and C are previously provided, and a suitable setting plug-in is selected based on information acquired from the device that is connected.

By providing such a configuration, a difference in the setting techniques for known devices is absorbed, and the user who performs the setting of the devices, without recognizing different interfaces that are generally different for different devices, using seemingly the same method and procedures regardless of the model of the device. In particular, for a business enterprise providing a support service for devices such as an Internet service provider, it is possible to easily perform the setting process for devices without needing to perform different operations for different models.

Next, an automatic setting process for the device of the first embodiment is explained.

Figure 6:
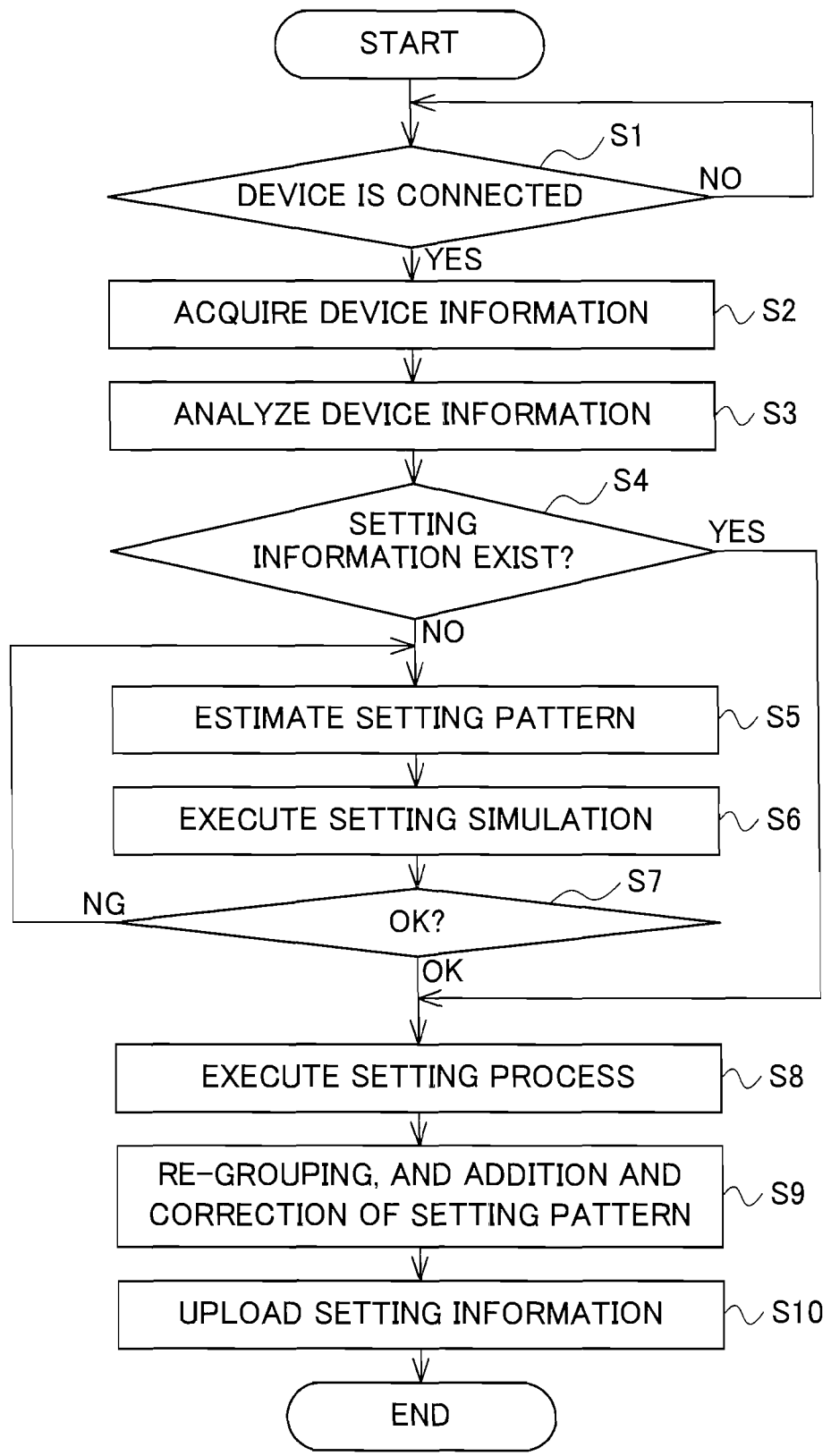
FIG. 6 shows a flowchart illustrating a flow of an automatic setting process for the device of the first embodiment.

FIG. 6 shows a flowchart showing a flow of the automatic setting process for the device of the first embodiment. In the following, the external device 20 that is an object of the setting process is a router, as an example.

Once the automatic setting process for the device starts according to a user instruction, in Step S1, the control unit 38 of the user terminal 10 determines whether or not the external device 20 is communicably connected. When the user terminal 10 and the external device 20 are communicably connected as a result of this determination, in Step S2, the device information acquiring unit 31 acquires device information necessary to perform the setting from the external device 20. Here, in Step S2, the device information to be acquired includes information such as the manufacturer of the router as the external device 20, the model, and the version.

Next, in Step S3, the device information analyzing unit 32 performs a structure analysis of the setting information based on the device information acquired in Step S2. Subsequently, in Step S4, the device information analyzing unit 32 determines, based on a result of the structure analysis obtained in Step S3, whether or not the setting information corresponding to the external device 20 exists in the setting data storing unit 36. When the setting information corresponding to the external device 20 exists in the setting data storing unit 36 as a result of this determination, the operation proceeds to Step S8.

On the other hand, when the setting information corresponding to the external device 20 does not exist in the setting data storing unit 36 as a result of this determination in Step S4, that is, the external device 20 unknown, in Step S5, the setting method estimate unit 33 estimates, based on the result of the structure analysis in Step S3, a setting technique for the external device 20. Specifically, the setting method estimate unit 33 estimates a setting template to be used based on the manufacturer information of the router acquired in Step S2, and selects the template as a candidate.

The estimation and selection of the setting template to be used can be made using arbitrary information of information of the device, such as the manufacturer, the model, and the version, instead of the manufacturer information. Moreover, the estimation and selection can be made based on similarity between file names and tiles of setting files, or based on similarity between script structures and contents or program structures and contents.

Next, in Step S6, the simulating unit 34 performs a simulation of the setting process for the external device 20, using the setting template selected as the candidate in Step S5. When the setting is possible as a result of the simulation in Step S6 (OK in Step S7), the operation proceeds to Step S8. On the other hand, when the setting is impossible (setting failure) (NG in Step S7), the operation returns to Step S5, and the processes of Step S5 and S6 as described above is performed, i.e., a different setting template is estimated and selected as the candidate and another simulation of setting process is performed.

For example, when the result of the simulation of the setting process for the external device 20 using the setting template B shown in FIG. 4 is selected as the candidate turns out that the setting is impossible using the setting template B, the next similar setting template B is selected as the candidate and a simulation of the setting process is performed.

In Step S8, the setting performing unit 35 performs an actual setting process for the external device 20. Specifically, when it is determined that the setting information corresponding to the external device 20 exists in the setting data storing unit 36 in Step S4, the setting performing unit 35 performs the setting process using the setting information. On the other hand, when it is determined that the setting information corresponding to the external device 20 does not exist in the setting data storing unit 36, the setting performing unit 35 performs the setting process using the setting template that is determined to be used for the setting in Step S7.

Next, in Step S9, the information update unit 37 performs regrouping of the setting information based on the simulation result of the setting process as described above, as well as addition and correction of the setting patterns (setting templates). Then, in Step S10, the information update unit 37 uploads the setting information acquired by the process in Step S9, the result of the structure analysis in Step S3, and the result of the simulation of the setting process performed in Step S6 to the server 30, and terminates the operation.

As described above, according to the first embodiment, the device information analyzing unit 32 performs the structure analysis of the setting information based on the device information required for setting the external device 20 that is acquired from the external device 20 that is communicably connected by the device information acquiring unit 31. As a result of the analysis, when the setting information corresponding to the external device 20 is stored in the setting data storing unit 36, that is, the external device 20 is a known device, the setting performing unit 35 uses the setting information stored in the setting data storing unit 36 to perform the setting process for the external device 20. On the other hand, when the setting information corresponding to the external device 20 is not stored in the setting data storing unit 36, that is, the external device 20 is an unknown device, the setting performing unit 35 automatically estimates the setting pattern information corresponding to the external device 20 (setting template) based on the result of the structure analysis of the setting information, and performs the setting process for the external device 20 using the estimated the setting pattern information.

With this configuration, the user terminal 10 can automatically recognize the setting technique in order to perform the setting process for the external device 20, and automatically perform the setting process for the external device 20 applying the recognized setting technique. Accordingly, the user can easily perform the setting process for the external device 20 without recognizing the model of the external device 20 and such.

Second Embodiment

The following describes a second embodiment of the present invention.

The second embodiment as described below is to perform a structure analysis of the setting information for performing the setting based on the device information acquired from the external device, specify the setting technique for the external device based on the result of analysis of the setting information and the structure, and realize the setting for the external device.

A configuration of the information processing system and a hardware configuration of the user terminal in the second embodiment is the same as the configuration of the first embodiment shown in FIG. 1 and FIG. 2, respectively, and therefore, the explanation is omitted. In the second embodiment, the information processing system is not necessarily provided with a server.

Figure 7:
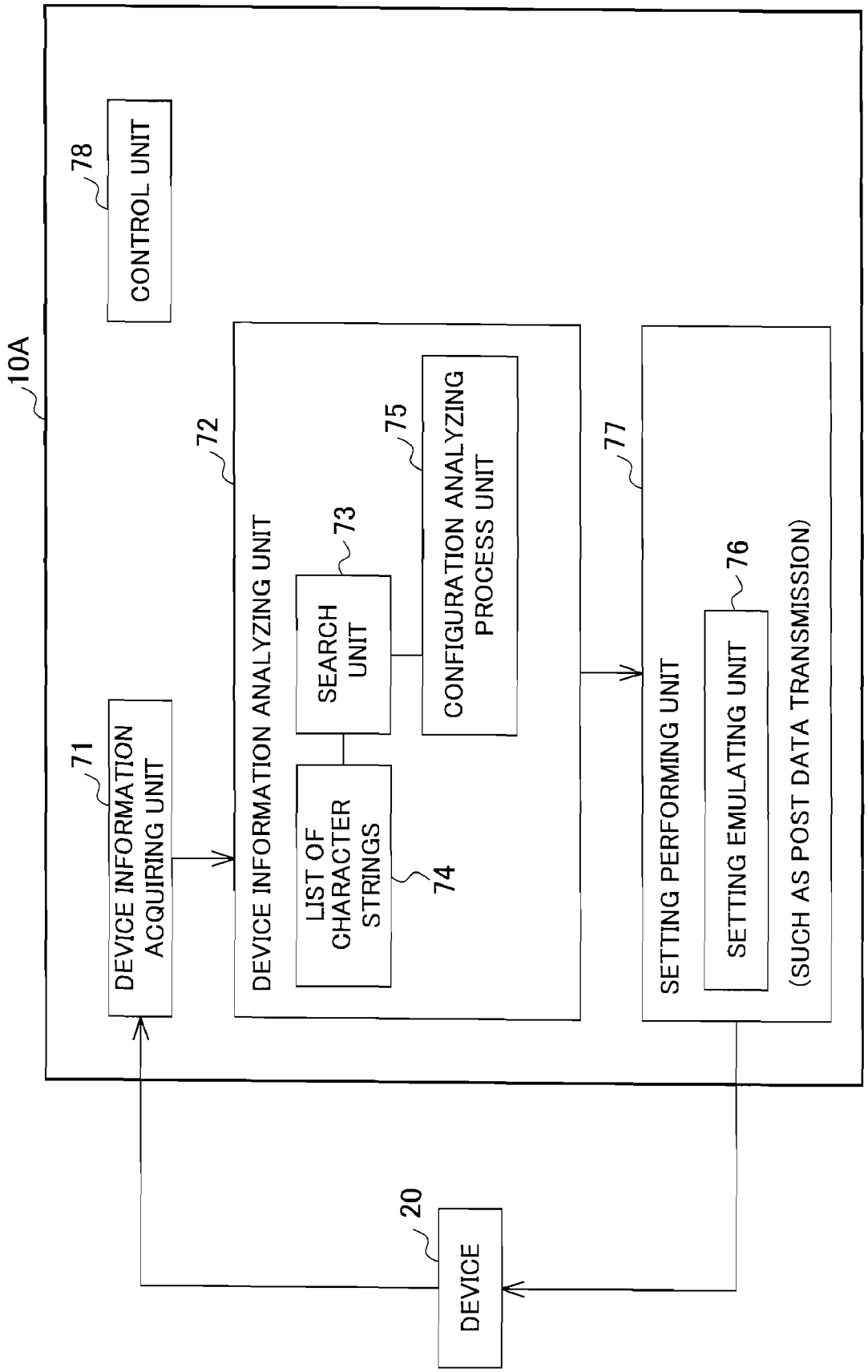
FIG. 7 shows a block diagram of an example of a functional configuration of a user terminal according to a second embodiment.

FIG. 7 shows a block diagram illustrating an example of a functional configuration of a user terminal 10A according to the second embodiment. In FIG. 7, only a functional block relating to the automatic setting process of the device in the user terminal 10A that is later described, and any functional block relating to other processes (for example, a routine computing process) is omitted as being the same as in a conventional configuration.

The functional units in the user terminal 10A shown in FIG. 7 are controlled in an overall manner by a control unit 78. A device information acquiring unit 71 acquires device information necessary for performing the setting from the external device 20 that is an object of the setting and communicably connected to the user terminal 10A. Further, the device information acquiring unit 71 provides a device information analyzing unit 72 with the device information for the external device 20 that has been acquired. Here, in the second embodiment, the device information that the device information acquiring unit 71 acquires from the external device 20 is a source code relating to a setting input screen of the external device 20, such as a setting utility screen, and described in a code in a script such as HTML (hypertext markup language) or Java (registered trademark) Script.

The device information analyzing unit 72 performs a structure analysis of the setting information for setting based on the device information acquired from the external device 20. Further, the device information analyzing unit 72 specifies the setting technique corresponding to the external device 20 based on the result of analysis of the setting information and the structure. The device information analyzing unit 72 includes a search unit 73, a list of character strings 74, and a configuration analyzing process unit 75.

In the list of character strings 74, character strings used for searching for information relating to the setting to be acquired in the device information (components that are to be set in the setting process) are previously registered. The search unit 73 performs a character search of the device information acquired from the external device 20 referring to the list of character strings 74. More specifically, the search unit 73 performs a full-text search of the device information from the external device 20 using the list of character strings 74, and extracts a component for writing in a setting value or to be selected.

The configuration analyzing process unit 75 specifies the setting technique corresponding to the external device 20 based on a result of the search by the search unit 73. Specifically, the configuration analyzing process unit 75 performs the structure analysis of the setting information relating to the external device 20 based on the search result of the search unit 73, and specifies a position for writing in a setting value or to be selected in the setting process.

An emulating unit 76 emulates the setting process for the external device 20 using the setting technique specified by the device information analyzing unit 72. A setting performing unit 77 has the device information analyzing unit 72 specify the information the setting method is specified based on the structure analysis of the setting, and the emulating unit 76 execute the setting process for the external device 20. Moreover, the setting performing unit 77 can generate setting character string data based on the result of the structure analysis of the setting information by the device information analyzing unit 72, such as URL transmission using POST data, for example, and then execute the setting process for the external device 20.

Next, the automatic setting process for the device according to the second embodiment is described.

Figure 8:
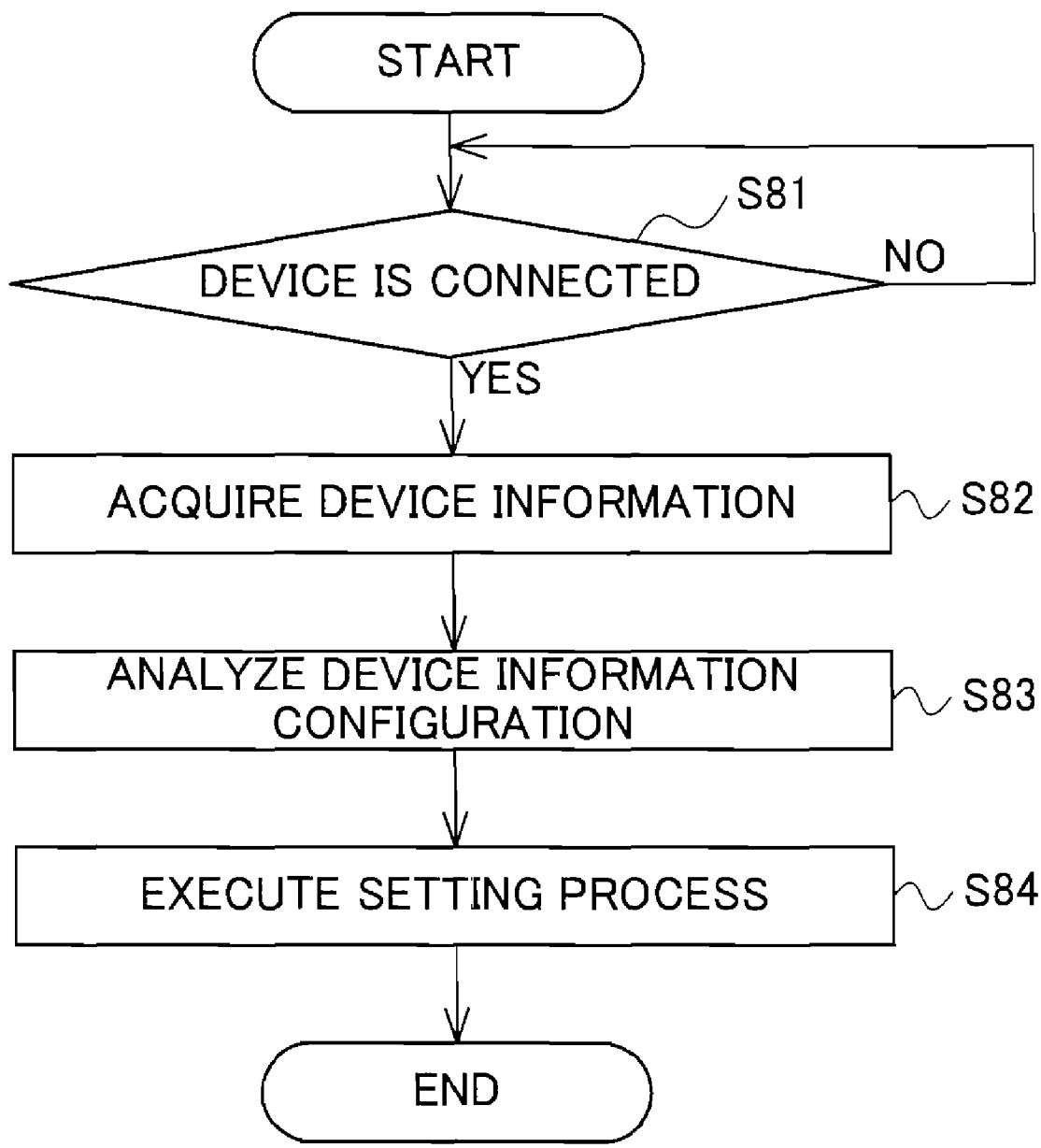
FIG. 8 shows a flowchart illustrating a flow of an automatic setting process for a device of the second embodiment.

FIG. 8 shows a flowchart illustrating a flow of the automatic setting process for the device according to the second embodiment. In the following, the external device 20 that is the object of the setting process is a router, as an example.

Once the automatic setting process of the device starts according to such as a user instruction, in Step S81, the control unit 78 of the user terminal 10A determines whether or not the external device 20 is communicably connected. When the user terminal 10A and the external device 20 are communicably connected as a result of this determination, in Step S82, the device information acquiring unit 71 acquires device information necessary to perform the setting from the external device 20. Here, the device information acquired in Step S82 includes the information (source code) relating to the setting input screen in which various setting of the router as the external device 20, as described above, is performed.

Next, in Step S83, the device information analyzing unit 72 performs a configuration analyzing process of the setting information based on the device information acquired in Step S82, and specifies a setting technique corresponding to the external device 20. The configuration analyzing process of the setting information in Step S83 will be detailed later.

Next, in Step S84, the setting performing unit 77 emulates the setting process using the setting technique specified in Step S83 with the emulating unit 76 to execute the setting process. Further, in Step S84, the setting performing unit 77 can generate setting character string data based on a result of the configuration analyzing process in Step S83 to execute the setting process for the external device 20.

It should be noted that, after executing an actual setting process for the external device 20 in Step S84, such as the result of the structure analysis of the setting information and information relating to such as the specified setting technique obtained from the above described automatic setting process can be uploaded to the server in the information processing system, as in the case of the first embodiment.

Figure 9:
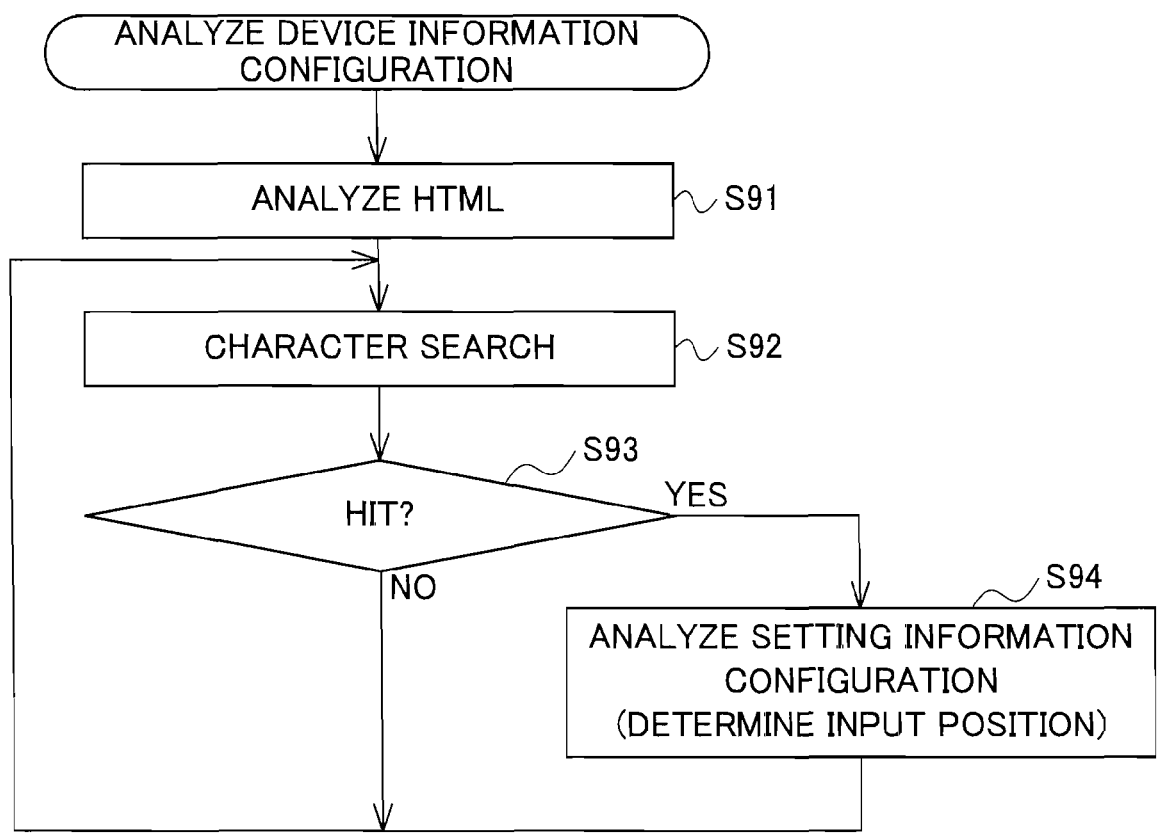
FIG. 9 shows a flowchart illustrating a flow of a configuration analyzing process of setting information.

FIG. 9 shows a flowchart illustrating the configuration analyzing process of the setting information in Step S73 in FIG. 8. In the following description, the device information acquired from the external device 20 is a source code relating to the setting input screen, as shown in FIGS. 10A and 10B, and described in HTML. FIGS. 10A and 10B respectively show diagrams illustrating the device information according to the second embodiment. FIG. 10A shows an example of the setting input screen, and FIG. 10B shows the source code for displaying the setting input screen as shown in FIG. 10A. Further, FIG. 11 shows an example of the list of character strings 74 for searching components categorized into a user name to be connected.

When the configuration analyzing process of the setting information starts, in Step S91, the device information analyzing unit 72 performs a HTML analyzing process based on the device information acquired in Step S82, and the acquired device information is split into components (for example, such as a tag and a character string). Then, in Step S92, the search unit 73 performs a full-text search using the list of character strings 74 for the device information from the external device 20 that has been split into the components in Step S91. In the search in Step S92, extraction of a components for writing or selecting a setting value from the device information from the external device 20 is intended, and accordingly, the character search using the list of character strings 74 should be performed only for portions relating to a tag for accepting an input such as at least INPUT tags and SELECT tags when the description is in HTML.

As a result of the search (character search) in Step S92, in Step S93, when there is a hit in the character strings registered in the list of character strings 74, in Step S94, the configuration analyzing process unit 75 extracts such as a tag relating to the character string that is hit in the search and a component of the character string.

Then, the configuration analyzing process unit 75 performs the structure analysis of the setting information according to the external device 20 based on the extracted component, and specifies a position for writing or selecting the setting value in the setting process. For example, the configuration analyzing process unit 75 specifies a control for an input of the setting value is a text box or a button, based on the extracted component. Further, the configuration analyzing process unit 75 specifies the position of the control (text box or button) for inputting the setting value with respect to a display of a corresponding setting item (character string) (next to the character string, or below the character string). In addition, the configuration analyzing process unit 75 can specify information such as input restriction by acquiring attribute information for the control.

Then, the above process is repeated until extracting all components that match the character string registered in the list of character strings 74 as a result of the full-text search for the device information acquired from the external device 20, and the operation proceeds to Step S84 shown in FIG. 8.

For example, by performing the process shown in FIG. 9 after preparing a list as the list of character strings 74 for searching components respectively categorized into the name of connection target, the user name of connection target, and the connection password, descriptions 101, 102, and 103 (group of components) are extracted in an example shown in FIG. 10B.

As described above, according to the second embodiment, the device information analyzing unit 72 performs the structure analysis of the setting information based on the device information necessary for performing the setting of the external device 20 acquired by the device information acquiring unit 71 from the external device 20 that is communicably connected, and specifies the setting technique for the external device 20 based on the result of analysis on the setting information and the structure. Then, the setting performing unit 77 uses the specified setting technique corresponding to the external device 20 to perform the setting process for the external device 20.

With the above configuration, regardless of the type of the setting information of the external device 20, the user terminal 10 automatically recognizes the setting technique for executing the setting process for the external device 20, and the setting process for the external device 20 can be automatically executed applying the recognized setting technique. Accordingly, the user can easily perform the setting process for the external device 20 without recognizing the model of the external device 20 and such.

While, in the above described second embodiment, the case in which the text search is performed in the character search of the device information acquired from the external device 20 as an example, the present invention is not particularly limited to such an example, and a binary code search can be performed.

Further, while the structure analysis of the setting information is performed using the list of character strings regarding such as HTML and Java (registered trademark) Script, it is also possible, regarding a normal binary program, to acquire and analyze the information such as the names of the control present on the setting input screen using the list of character strings on the program to perform the setting process. In addition, it is also possible to acquire and analyze the characters on the screen with an OCR technique using the list of character strings to perform the setting process.

The above described first embodiment shows the case in which the setting process is realized using such as the setting information selected and the setting pattern information estimated based on the device information from the external device 20, and the second embodiment shows the case in which the setting process is realized by specifying the setting technique based on the device information from the external device 20. These embodiments can be combined. For example, when the setting information corresponding to the external device 20 exists (setting information is known), the setting process can be performed using the setting information that is previously held, and when the setting information corresponding to the external device 20 does not exist, the setting process can be performed specifying the setting technique based on the device information from the external device 20.

Third Embodiment

The following describes a third embodiment according to the present invention.

In the above described second embodiment, the search for the device information acquired from the external device is performed referring to the list of character strings 74, the structure analysis of the information relating to the setting is performed based on the search result, the setting technique is specified and based on the result of the structure analysis, to perform the automatic setting process for the external device. Here, by appropriately selecting the character strings that are to be registered in the list of character strings in the second embodiment, it is possible to search information that is different to the information relating to the setting and extract the information from the device information acquired from the external device.

In the third embodiment described below, the device information is acquired from the external device that is communicably connected, and the acquired device information is analyzed to acquire the information relating to the external device such as the setting state and the operating state.

Figure 12:
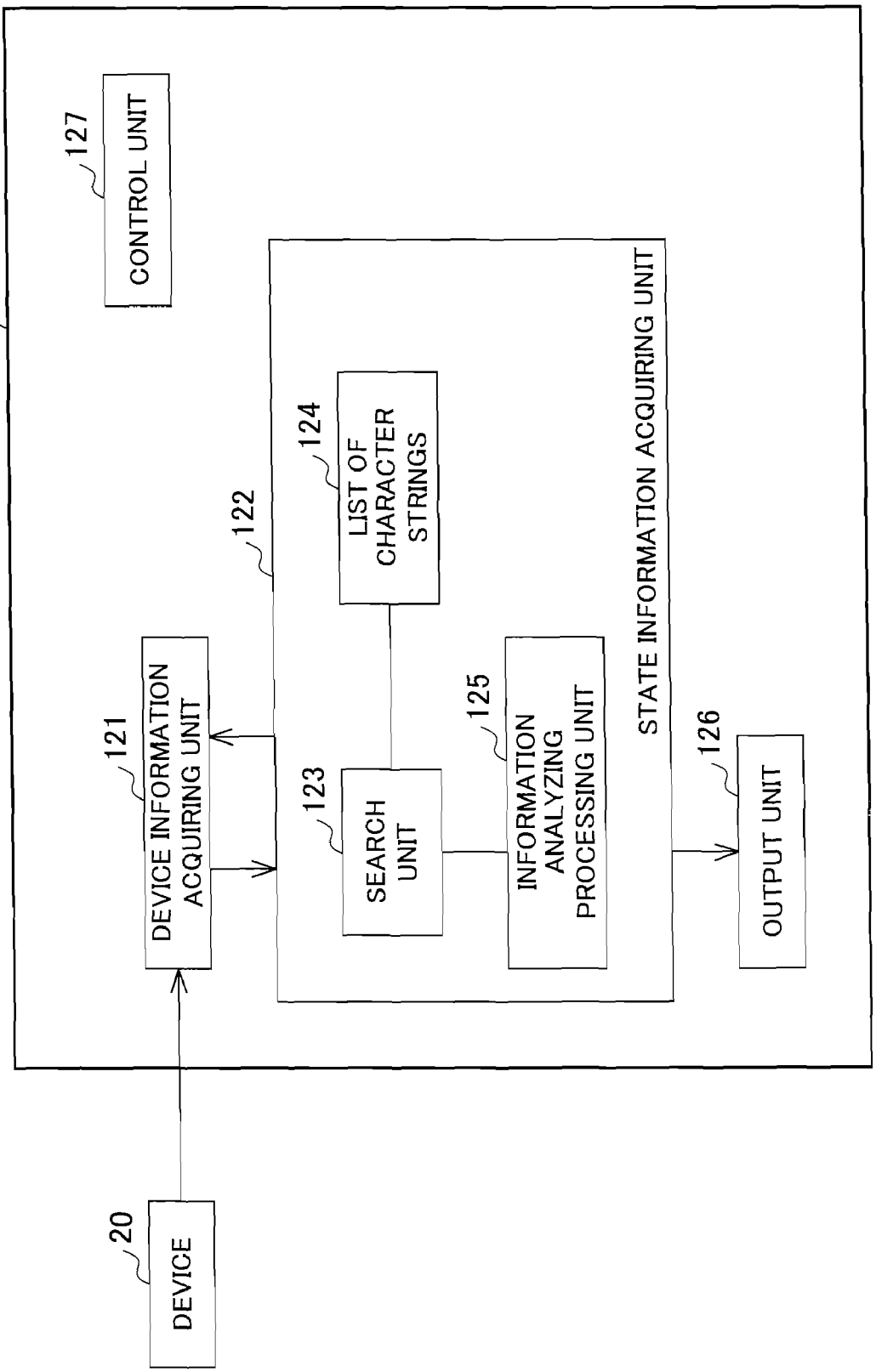
FIG. 12 shows block diagram illustrating an example configuration of a system according to a third embodiment.

FIG. 12 shows an example of a system configuration according to the third embodiment.

In FIG. 12, numeral 10B indicates a user terminal (for example, a personal computer) and 20 indicates an external device. The user terminal 10B and the external device 20 are communicably connected via predetermined communication interfaces provided respectively.

The external device 20 is, for example, a router, an IP (Internet Protocol) telephone terminal, a set-top box, a printer, a home server, or such, and records its own setting state and operating state as needed as the device information and such. The above listed examples of the external device 20 are mere examples, and the present invention is not limited to these.

The user terminal 10B acquires the device information from the external device 20 communicably connected via the communication interface. The user terminal 10B performs the search process to the acquired device information, and analyzes a result of the search to acquire the information relating to the external device 20 such as the setting state and the operating state. A hardware configuration of the user terminal 10B is the same as in the first embodiment; functions of device information acquiring means and state information acquiring means according to the present invention are realized by a computer program stored in the CPU or the ROM (or the external storage device).

The user terminal 10B includes a device information acquiring unit 121, a state information acquiring unit 122, an output unit 126, and a control unit 127. In the user terminal 10B shown in FIG. 12, a functional block relating to the state information acquisition process of the device that is later described. However, other functional blocks relating to such as a common computing process are the same as in the conventional example.

The functional units of the user terminal 10B shown in FIG. 12 are controlled by the control unit 127 in an overall manner.

The device information acquiring unit 121 acquires the device information from the external device 20 that is communicably connected to the user terminal 10B. Further, the device information acquiring unit 31 provides the state information acquiring unit 122 with the device information acquired from the external device 20. Here, the device information acquired from the external device 20 is the setting state, the operating state, and such of the external device 20 recorded and held by the external device 20. Examples of such device information include configuration information relating to the setting, failure log information relating to failures that have occurred, and communication log information relating to communication history.

These device information can be acquired by the source code describe, such as HTML, for displaying information providing screen provided by the external device 20. Alternatively, the device information can be held as a file by the external device 20 and then acquired by the external device 20 reading the file. When the external device 20 holds the device information to be acquired as a file, the state information acquiring unit 122 search for a type attribute in a INPUT tag being file, for example, in the source code relating to various setting screen in the external device 20, and specifies a path for the file based on the description and reads the file.

The state information acquiring unit 122 acquires information relating to the setting state and the operating state of the external device 20, based on the device information acquired from the external device 20. The state information acquiring unit 122 includes a search unit 123, a list of character strings (dictionary) 124, and an information analyzing processing unit 125.

In the list of character strings 124, character strings for detecting and extracting predetermined information from the device information acquired from the external device 20 are previously registered. Here, the character strings registered in the list of character strings 124 can be text data or binary data. Further, the text data can be ASCII character strings (one-byte character strings), a two-byte character strings, or a combination of these.

The search unit 123 performs the character search of the device information acquired from the external device 20, referring to the list of character strings 124. Specifically, the search unit 123 performs the full-text search for the device information from the external device 20 using the list of character strings 124, and extracts the information relating to such as the setting state and the operating state.

The information analyzing processing unit 125 analyzes the information such as the setting state and the operating state of the external device 20 based on the search result by the search unit 123, and acquires the information relating to the external device 20 such as the setting state and the operating state. Examples of information acquired by the information analyzing processing unit 125 include a communication state to the network (connected or disconnected), IP telephone line state (SIP server state), WAN (external network) IP address, and such, if the external device 20 is a router, for example.

The output unit 126 outputs the information relating to the external device 20 such as the setting state and the operating state acquired by the state information acquiring unit 122, based on the device information from the external device 20.

Although not shown, in FIG. 12, the user terminal 10B can include a network interface, and be communicably connected to a network such as the Internet. Furthermore, if the external device 20 is a device, such as a router, that is connectable to the network, the external device 20 can be connected to the network via the network interface provided for the external device 20.

Next, the state information acquisition process of the device according to the third embodiment is described.

Figure 13:
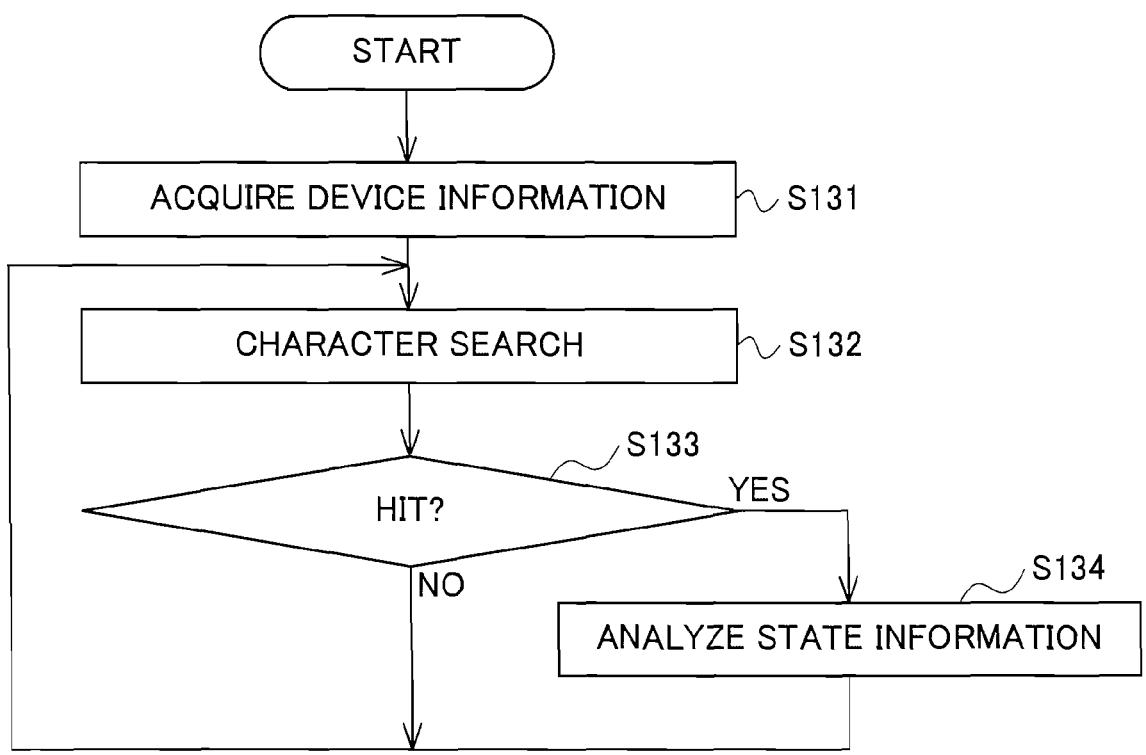
FIG. 13 shows a flowchart illustrating a flow of a state information acquisition process of the device according to the third embodiment.

FIG. 13 shows a flowchart showing a flow of the state information acquisition process of the device according to the third embodiment.

When the state information acquisition process of the device starts, first in Step S131, the control unit 127 of the user terminal 10B acquires device information necessary to analyze the setting state and the operating state from the external device 20 that is communicably connected.

Next, in Step S132, the search unit 123 of the state information acquiring unit 122 performs the character search of the device information acquired in Step S131 using the list of character strings 124. As a result of the search in Step S132 (character search), when there is a character string that match the character string registered in the list of character strings 124 in Step S123, the information analyzing processing unit 125 performs the information analysis of the setting state and the operating state based on the result of the search in Step S124, and acquires the information relating to the external device 20 such as the setting state and the operating state.

Then, the above described process is repeated until all components that match the character strings registered in the list of character strings 124 are extracted as a result of the full-text search for the device information acquired from the external device 20, the list of character strings 124. Next, the output unit 126 output the information relating to the external device 20 such as the setting state and the operating state that has been acquired, and the state information acquisition process for the device ends.

Figure 14:
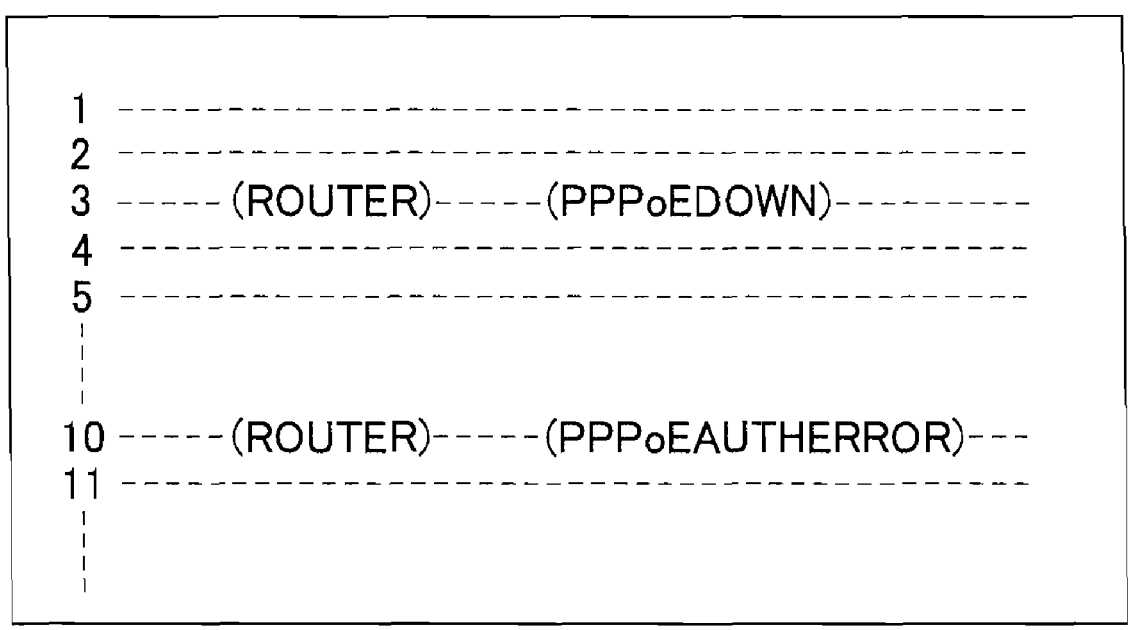
FIG. 14 shows a diagram for illustrating information acquisition relating to an external device according to the third embodiment.
Figure 15:
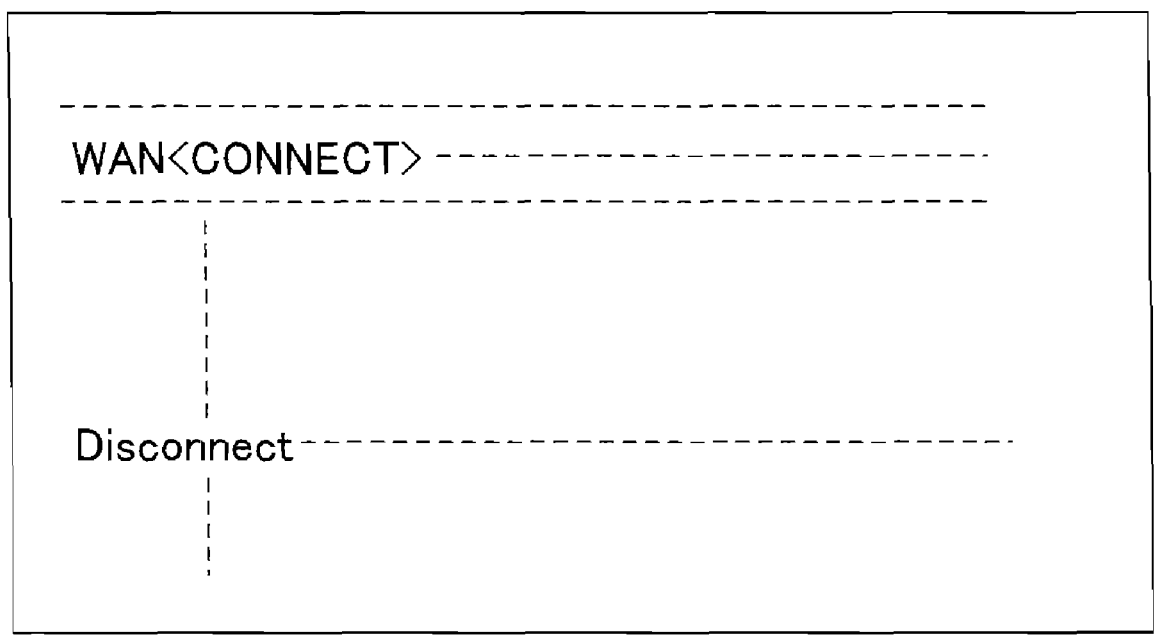
FIG. 15 shows a diagram for illustrating the information acquisition relating to the external device according to the third embodiment.

FIG. 14 and FIG. 15 show diagrams for illustrating the information acquisition relating to the external device 20 according to the third embodiment. In FIG. 14, a so-called failure log relating to failures occurring in the external device 20 is shown as an example, and in FIG. 15, a so-called communication log relating to communication history for the external device 20 is shown as an example.

For example, assuming that "PPPoEDOWN" indicating disconnection and "PPPoEAUTHERROR" indicating an authentication failure as character strings for searching for information relating to the failure state are registered in the list of character strings 124 of the state information acquiring unit 122, a third description and a tenth description that are search character strings are extracted in the failure log acquired from the external device 20 as shown in FIG. 14, are analyzed by the information analyzing processing unit 125, and the information relating to the state acquired as a result of the analysis is externally outputted.

Further, "WAN<CONNECT>" indicating an initiation of connection to the WAN and "Disconnect" indicating a disconnection that are used for searching for the information relating to the operating state are registered in the list of character strings 124 of the state information acquiring unit 122, descriptions corresponding to the search character string are extracted from the communication log acquired from the external device 20 as shown in FIG. 15, and are analyzed by the information analyzing processing unit 125, and the information relating to the state acquired as a result of the analysis is externally outputted.

As described above, according to the third embodiment, the state information acquiring unit 122 performs an analysis of the information relating to the state based on the device information necessary for analyzing the setting state and the operating state for the external device 20 acquired from the external device 20 that is communicably connected by the device information acquiring unit 121, and the acquired information relating to the state is externally outputted by the output unit 126. With this configuration, the state information relating to the setting state and the operating state can be automatically analyzed and acquired from the external device 20 that is communicably connected.

While, in the above description, the structure analysis for the setting information is performed using the list of character strings such as HTML and Java (registered trademark) Script, it is also possible, regarding a normal binary program to acquire the information such as the names of the control present on the setting input screen using the list of character strings on the program. In addition, it is also possible to acquire the characters on the screen with an OCR technique using the list of character strings.

Other Embodiments of the Present Invention

It should be noted that a case in which the functions as described in the above embodiments are realized by recording a program for having a computer to perform the functions as described in the above embodiments in a storage medium such as a CD-ROM, and by having the computer read the program, such a program itself, and the storage medium having the program recorded thereon are also included in the embodiments of the present invention. Examples of the storage medium having the program recorded thereon include, other than the CD-ROM, a flexible disk, a hard disk, a magnetic tape, a magnetic optical disk, a nonvolatile memory card, and the like.

In addition, not only the case in which the functions as described in the above embodiments are realized by the computer executing a program provided, but a case in which the program realizes the functions as described in the above embodiments cooperatively with an operating system (OS) or another application software on which the program is running in the computer, or a case in which all or a part of the process of the provided program is performed by a function enhancement board or a function enhancement unit of the computer to realize the functions as described in the above embodiments, such a program is included in the embodiments of the present invention. Moreover, a different computer may execute a part of the program.

Any of the above embodiments only exemplifies a specific implementation of the present invention, and it should not be in any way interpreted as limiting the technical scope of the present invention. That is, the present invention can be implemented in various ways without departing its technical concept and principal features.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A device content setting apparatus that causes a device to be ready for operation where device content to be set is common among a plurality of devices and where each device has particular information related to a screen for performing a content setting process, the apparatus comprising:
   a device information acquiring unit configured to acquire device information including codes associated with the information related to the screen for performing the content setting process, from a device communicably connected with the device content setting apparatus;
   an information analyzing unit configured to analyze by a text search for the device information including codes that is acquired by the device information acquiring unit, with reference to a list of texts that comprise candidates of texts registered in advance to be applied to searching for elements to be set in the setting process of the device, such that the information analyzing unit analyzes a configuration of information associated with setting of the device; and a setting execution unit configured to:
- determine which of a text box and a button is required as control for entering the contents to be set up associated with the device based on a result of an analysis performed by the information analyzing unit;
- identify how one of the text box and the button is placed relative to a display of an item to be set up;
- determine a location where one of writing into the text box and depressing the button is performed so as to enter the contents; and
- perform the setting process for the device with the contents at the determined location.

2. The device content setting apparatus according to claim 1, wherein the text search performed for the device information including codes comprises a full-text search such that the information analyzing unit extracts the elements to be set from the information related to the screen for performing the content setting process.

3. The device content setting apparatus according to claim 1, further comprising a state information acquiring unit that is configured to perform a full-text search for communication logs between the device content setting apparatus and the device and perform the setting process for the device based on a result of the full-text search.

4. The device content setting apparatus according to claim 1, wherein the codes comprise Hyper Text Markup Language and Java Script.

5. A method for setting a device to be ready for operation where device content to be set up is common among devices and each device has particular information related to a screen for performing a content setting process, the method comprising:

acquiring device information including codes associated with the information related to the screen for performing the setting process, from a device communicably connected with a device setting apparatus;

analyzing by a text search for the device information including codes with reference to a list of texts that comprises candidates of texts registered in advance to be applied to searching for elements to be set in the setting process of the device, such that a configuration of information associated with setting of the device is analyzed;

determining which of a text box and a button is required as control for entering the device contents to be set up associate with the device based on a result of analyzing;

identifying how one of the text box and the button is placed relative to a display of an item to be set up;

determining a location where one of writing into the text box and depressing the button is performed so as to enter the contents; and performing the setting process for the device with the device contents at the determined location.

6. The method according to claim 5, wherein the text search performed for the device information including codes comprises a full-text search such that the elements to be set is extracted from the information related to the screen for performing the setting process.

7. The method according to claim 5, further comprising a step of acquiring state information that performs a full-text search for communication logs between the device setting apparatus and the device and performs the content setting process for the device based on a result of the full-text search.

8. The method according to claim 5, wherein the codes comprise at least one of Hyper Text Markup Language or Java Script.

9. A storage medium encoded with a machine-readable computer program code, the storage medium including instructions executable on a processor to implement a method for setting a device to be ready for operation where device content to be set up is common among devices and each device has particular information related to a screen for performing a content setting process, the method comprising:

acquiring device information including codes associated with the information related to the screen for performing the content setting process, from a device communicably connected with a device setting apparatus;

analyzing by a text search for the device information including codes with reference to a list of texts that comprises candidates of texts registered in advance to be applied to searching for elements to be set in the setting process of the device, such that a configuration of information associated with setting of the device is analyzed;

determining which of a text box and a button is required as control for entering the device contents to be set up associated with the device based on a result of analyzing;

identifying how one of the text box and the button is placed relative to a display of an item to be set up;

determining a location where one of writing into the text box and depressing the button is performed so as to enter the contents; and performing the content setting process for the device with the contents at the determined location.

10. The storage medium according to claim 9, wherein the text search performed for the device information including codes comprises a full-text search such that the elements to be set is extracted from the information related to the screen for performing the content setting process.

11. The storage medium according to claim 9, further comprising a step of acquiring state information that performs a full-text search for communication logs between the device setting apparatus and the device and performs the content setting process for the device based on a result of the full-text search.

12. The storage medium according to claim 9, wherein the codes comprise at least one of Hyper Text Markup Language or Java Script.

* * * * *